June 4, 1968 D. WILLISON ET AL 3,386,597
RAILWAY CAR FRICTION-TYPE DRAFT GEAR
Filed Jan. 12, 1967 2 Sheets-Sheet 1

INVENTORS
DONALD WILLISON
ANDREY L. ZANOW
BY
ATTORNEY

June 4, 1968  D. WILLISON ET AL  3,386,597
RAILWAY CAR FRICTION-TYPE DRAFT GEAR
Filed Jan. 12, 1967  2 Sheets-Sheet 2

INVENTORS
DONALD WILLISON
ANDREY L. ZANOW
BY
ATTORNEY

# United States Patent Office 3,386,597
Patented June 4, 1968

3,386,597
RAILWAY CAR FRICTION-TYPE DRAFT GEAR
Donald Willison, Lyndhurst, and Andrey L. Zanow, Cleveland, Ohio, assignors to Midland-Ross Corporation, Cleveland, Ohio, a corporation of Ohio
Filed Jan. 12, 1967, Ser. No. 608,812
10 Claims. (Cl. 213—32)

ABSTRACT OF THE DISCLOSURE

A draft gear having a friction clutch, springs for actuating the clutch, and a casing of which a rear compartment encloses the springs and a front barrel of rearwardly tapering bore substantially encloses the friction clutch mechanism. The clutch is of the type wherein shoes which seat within the bore slidably against the inner barrel surfaces and against spring seat means disposed between the springs and the shoes, and a wedge engages the shoes through rear surfaces in inclined relation with the shoes and protrudes frontwardly from the barrel. This invention is directed particularly to divided spring seat structure through which the springs selectively act on the shoes, and to a portion of the structure inclined with respect to the length of the gear to direct the forces acting on the shoes on a particular manner.

DESCRIPTION

Some major difficulties that arise in the use of conventional draft gears employing a friction clutch of the above-mentioned general type are:

(1) the clutch parts become immobilized as the result of "seizure" of the shoes with the surfaces forming the bore of the barrel; and (2) the shoes, after executing a work stroke, do not return to a properly seated relation with the surfaces of the bore in returning to neutral position and thus are partially or wholly out of frictional contact with the bore in successive work strokes.

These difficulties arise through attempts to achieve extremely high draft gear capacities while maintaining draft gear pocket dimensions which were established as standard many years ago. "Sticking" or "seizing" of the shoes with the barrel of the casing is observed to arise in draft gears wherein the shoes contact a backing plate (of a gear) standing between them and the springs along surfaces which are perpendicular to the longitudinal axis of the gear and arise as a result of excessive laterally directed forces between the frictionally engaged surfaces of the barrel and the shoes.

The other major difficulty mentioned above, i.e., the loss of frictional contact of the shoes with the barrel, arises through efforts to overcome "sticking" as just described by constructing the backing plate and the shoes with the contacting surfaces thereof sloping at an angle inwardly and rearwardly from the barrel. Such a slope or inclination tends to lift the shoes away from the barrel as the shoes progress outwardly or frontwardly along the barrel during a return stroke to break the shoes away from the barrel as the result of any sticking or seizing.

In practice, the contacting surfaces of the shoes and the backing plate are subjected to extreme pressure and, on account of the taper of the barrel, the shoes and the backing plate undergo a small amount of relative movement in a direction transverse to the main direction of contraction of the draft gear. Hence, the contacting surfaces become eroded essentially in the formation of indentations along the rear end surfaces of the shoes. Such surface irregularities prevent the shoes from freely shifting in a transverse outward direction because the draft gear expands to a neutral condition and the shoes are intended to move in a diverging direction of the tapered barrel. Consequently, the shoes tend to lose contact with the barrel end, in a badly worn draft gear, may not establish contact with the barrel during successive working strokes.

A further factor which tends to restrain free release of the clutch parts is a strong frictional force retained between the wedge and the shoes during the return stroke to neutral condition in a conventional gear incorporating inclined shoe and backing plate surfaces. The source of this frictional force is a force component exerted by the backing plate through the shoes which extends on a bias with the longitudinal axis of the gear almost perpendicularly to the direction of inclination of the engaged wedge and shoe surfaces. Such component force is also nearly perpendicular to the direction of inclination of wedge-to-shoe contact with respect to the draft gear axis since the angle of wedge-to-shoe contact dose not vary substantially from the angle of shoe-to-backing plate contact.

In designing the high-capacity draft gears now required, the designer finds it nearly impossible to establish an angle of contact between the shoes and the backing plate which will avoid both "seizure" and failure of contact of the shoes with the barrel. Since, under the stringent performance conditions now required, these basic difficulties seem to be overlapping.

Hence, a major object of this invention is to provide a high-capacity spring and friction-clutch type draft gear which is capable of unusually consistent performance as a result of its freedom from seizure and discontinuous contact of friction of clutch parts.

It is also an object to provide a draft gear in accordance with the foregoing object that has capacity for receiving forces of at least 500,000 pounds and around 36,000 foot pounds of work in a single work stroke.

The objects of the invention are achieved in a draft gear having a spring-actuated friction clutch mechanism wherein the major features are:

(1) the spring seat means normally interposed between the friction clutch and the springs is comprised of two elements of which an outer one surrounds an inner one and both elements act as spring seats of different springs against different surfaces of the shoes of the friction clutch; and (2) the set of surfaces of the shoes which engage the outer spring seat element are inclined inwardly and rearwardly toward the axis of the gear to achieve a mode of force application on the shoe during gear compression and release which prevents seizure of the shoes with the barrel of the casing.

In a preferred form of the invention, the outer spring-seat element and the casing provide stop means for holding the outer element out of contact with the shoes during a small terminal portion of the movement cycle of the clutch which corresponds to the movement into neutral or fully-expanded condition of the gear.

Another feature is the presence of relatively soft or yieldable material of convex contour in one of two opposed parts of the clutch at points of high force concentration to induce greater wear of the softer of such parts without the formation of depressions or ridges which impair the operation of the draft gear.

In the drawings with respect to which the invention is described:

Figure 1:
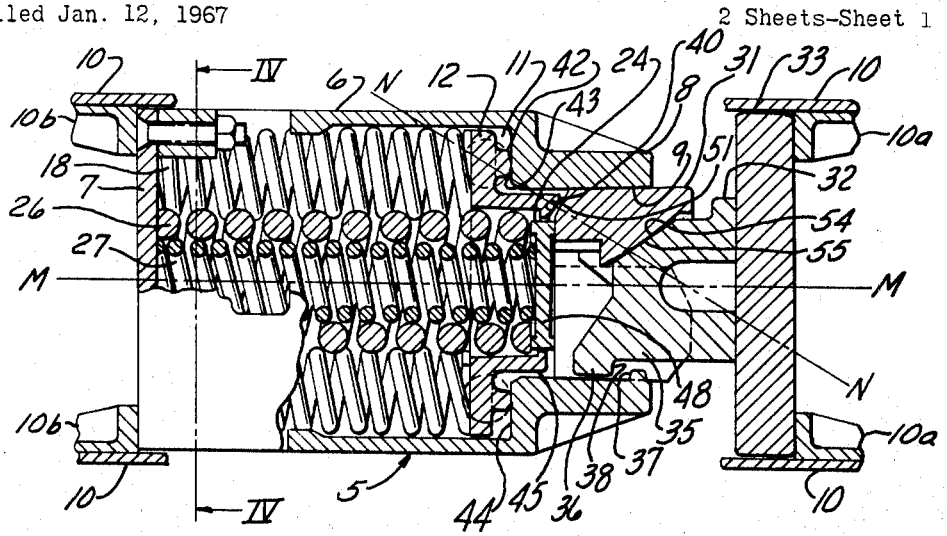
FIG. 1 is a plan view of a draft gear embodying the invention, partially in section along line I—I of FIG. 3.
Figure 2:
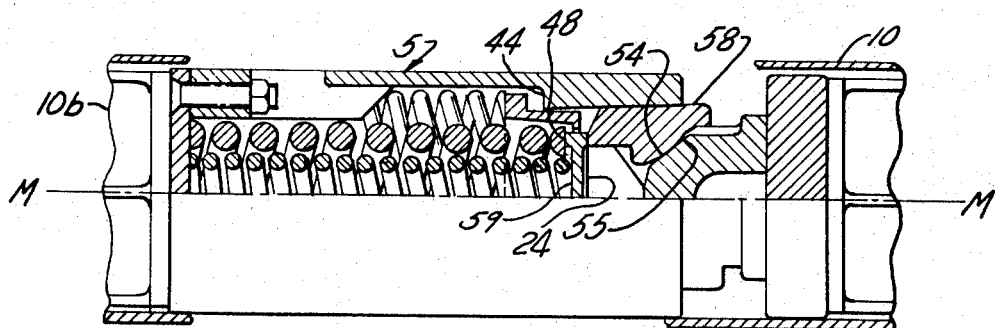
FIG. 2 is a side elevation partially in section along line II—II of FIG. 3.
Figures 3, 4:
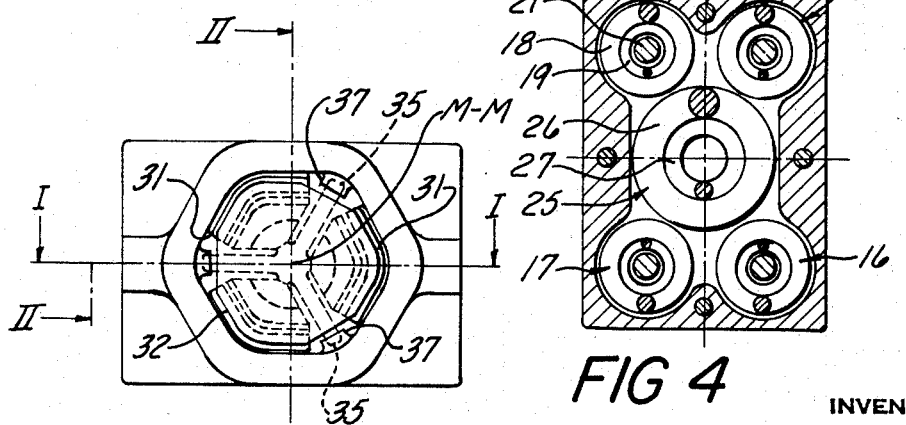
FIG. 3 is an end view of the draft gear with the front follower thereof removed.
FIG. 4 is a view in section taken along line IV—IV of FIG. 1.

FIGS. 1 and 2 illustrate a fully assembled draft gear 5 in accordance with a preferred embodiment of the invention in position between the front and rear stops 10a, 10b of a conventional draft gear pocket within a center sill 10. The gear 5 comprises a casing 6 having a rear plate-like wall and a front barrel 8. The barrel has an interior normally machine-finished surface 9 which functions as a component of a friction clutch mechanism of the draft gear. The surface 9 defines a bore which tapers slightly rearwardly toward the spring compartment 11. Other components of the draft gear contained within the casing 6 include an outer spring seat element 12 functioning as a spring seat for four sets of springs 14, 15, 16, and 17 of which each spring set comprises an outer spring 18 and an inner spring 19 of equal length. Extending centrally of each spring set is a guide 21 in loose slidable relationship with the spring seat element 12.

Figure 7:
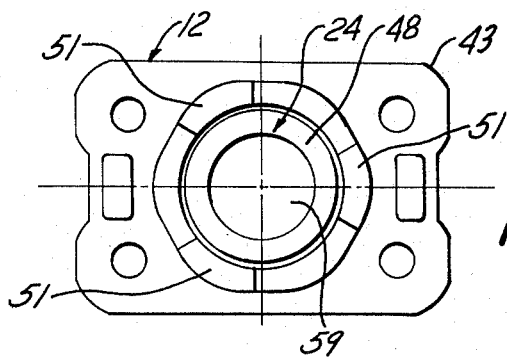
FIG. 7 is a view of spring seat elements shown also in FIGS. 1 and 2, as viewed along the draft gear axis.
Figure 8:
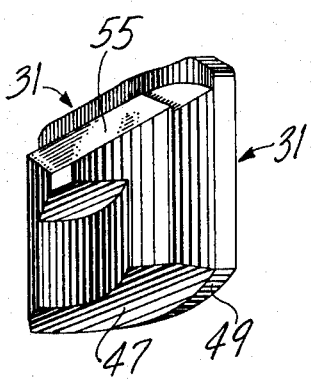
FIG. 8 is a perspective view of a shoe of the friction clutch of FIGS. 1 to 3, as viewed in an outward frontward direction of the draft gear.

The draft gear further includes another inner spring seat element 24 which functions as the seat for a central larger spring set 25 comprising springs 26 and 27. Spring seat elements 12 and 24 are generally concentric with each other as shown in FIG. 7 and concentric with the longitudinal axis M—M of the draft gear.

As shown, the draft gear also comprises, as a part of the friction clutch, three shoes 31 supported in slidable relation with the interior surface 9 of the barrel 8, a wedge 32, and a front follower 33 which may or may not be fixedly attached to the wedge.

The draft gear is constructed in a manner enabling it to remain in assembled condition when removed from the center sill pocket. For this purpose the wedge 32 is constructed with three webs 35 arranged in a spoke-like pattern which terminate rearwardly in radially projecting lugs 36 that project in a radial direction between the three shoes 31 and overlap with three lugs 37 of the casing projecting radially inwardly from the forward extremity of surface 9 of the barrel 8. In FIGS. 1 and 2, the draft gear is shown in its neutral condition within the draft gear pocket provided by the center sill 10 in its neutral condition wherein it is slightly compressed. These figures indicate that the wedge 32 and the shoes 31 have been moved slightly rearwardly relative to the barrel 8 to produce a gap 38 between the wedge lugs 36 and the casing lugs 37. In the free state of the draft gear, these lugs engage to retain the shoes, the spring seat 24, and the spring 27 within the draft gear.

To be further noted from FIGS. 1 and 2 is that a gap 40 exists between the shoes 31 and the outer spring seat 12 at neutral condition. This gap is increased at the free condition of the draft gear and closed upon a slight movement of the shoes rearwardly from their position corresponding to the neutral condition of the draft gear. The width of this gap may be regulated in an obvious manner by the height of the lugs 42 protruding forwardly from the plate portion 43 of the spring seat element 12 to engage a shoulder surface 44 formed at the junction of the barrel and the spring compartment of the casing. The element 12 further comprises a forward-extending cylindrical flange 45 which, throughout the major portion of the range of movement of the shoes 31, overlaps the barrel surface 9 in a longitudinal direction.

The essential improvement in the function of the draft gear obtained by the present invention is that the shoes 31 have greater freedom to reseat themselves in a draft gear that is designed for freedom from seizure of the shoes with the barrel surfaces. To this end, the shoes are provided with two types of rear end surfaces which engage the spring seat elements 12 and 24. With respect to axis M—M, each shoe 31 has a radially inward surface 47 in continuous, substantially planate engagement with a surface 48 of the spring seat element 24 and an outward surface 49 which is engageable with the three end surfaces 51 on the flange 45 of the outer spring seat 12 after a slight movement of the shoes rearwardly from neutral position.

The wedge has rearward-facing surfaces 54 of which each engages a surface 55 of one of the shoes 31. These surfaces incline rearwardly and inwardly toward the rear axis M—M in a manner known to the art.

The friction clutch mechanism of this draft gear is designed with engageable relatively movable surfaces of the parts contoured and hardened according to an arrangement for avoiding the formation of contours in the engaged surfaces which impair smooth operation of the draft gear. For example, because of the taper of the interior surface 9 of the barrel 8, the shoes 31 move in an inward radial direction relative to the spring seat elements during a compression stroke of the draft gear. The wedge, although its general movement is rearward, is forced forwardly relative to the shoes to a less re-entrant position therewith.

Figure 5:
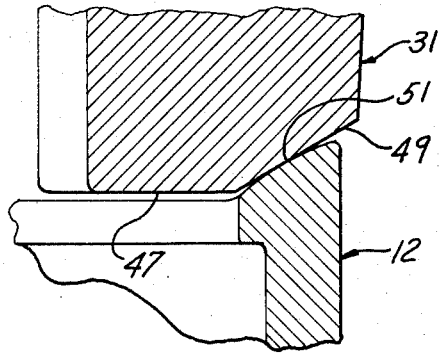
FIG. 5 is an enlarged fragmentary elevation of clutch parts taken along line I—I also of FIG. 3.
Figure 6:
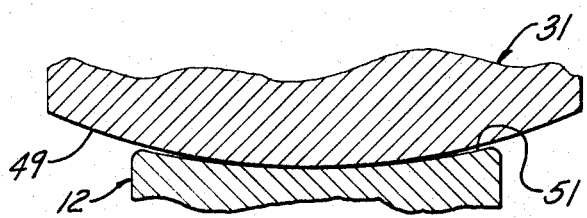
FIG. 6 is an enlarged fragmentary view in cross section of parts of a wedge and a shoe in engaged relation as taken along plane N—N of FIG. 1.

Movement of the shoes relative to the outer spring seat 12 is essentially along the direction of inclination of the shoe surface 49. FIG. 6 portrays the shoe surface 49 in contact with one of the three surfaces 51 of the element 12 along a plane, such as plane N—N of FIG. 1 extending at right angles with the direction of inclination of the surface 49. Surfaces 51 and 49 are preferably of cylindrical configuration with respect to generation by radii within the plane N—N. Such a configuration will cause the shoes to shift with regard to respective spring seat element surfaces 61 without jamming. As shown in FIG. 5, the surface 51 is also convex along a radial plane, whereas the surface 49 has a straight silhouette within this plane. As all surfaces of the shoe entering into the operation of the friction clutch are "skin hardened" to a depth of approximately one-sixteenth to one-eighth of an inch, such as by flame hardening, the surfaces 51 wear into a flatter configuration which tends to be complementary to the surfaces 49. By a similar pattern of hardening, complementary relationship is obtained between the outer surfaces 58 of the shoes relative to the slightly softer interior surface 9 of the barrel 8. The hardness of the working surfaces of the shoes may be in the order of, e.g., 60 to 64 Rockwell with the barrel and the spring seat elements having a hardness of 30 to 35 Rockwell.

As between the wedge 32 and the shoes, the best wearing condition is obtained if the surfaces 55 of the shoes are skin hardened to a hardness slightly greater than that of a case hardened condition (i.e., a greater depth of hardening) of the wedge wherein hardness decreases gradually from, e.g., 58 to 60 Rockwell at the surface of the wedge inwardly therefrom. As manufactured, the surface 55 is formed with a slight degree of convex spheroidity with the wedge surface 54 formed approximately flat. Experience shows that even though the surface 55 is harder than surface 54, it will be pounded into a nearly flat condition after a short service period because of yielding of soft material underneath the hard skin surface to a desired wear relationship of the wedge and the shoes.

In preparing the wedge and the shoes for use, the wedge and the shoes, which are normally castings of a medium carbon steel, such as an 0.3% carbon steel, are initially carburized to a depth up to approximately 1/8 of one inch and a carbon content within the carburized layer of up to 0.9%. The carburized shoes are thereafter "skin hardened," i.e., the surfaces of each shoe are subjected, e.g., to a flame treatment which quickly heats essentially the carburized layer to a temperature above the critical temperature of the steel. Before the heat can penetrate to any substantial extent beyond the layer, a liquid quench, applied usually by the same fixture which comprises the flame heater, quickly cools the carburized layer below the critical temperature. In this manner, the shoes are provided with a relatively hard skin of which the depth may extend to the full depth of the carburized layer overlaying relatively soft steel disposed immediately inward of the carburized layer.

The wedge, while having a similar carburized layer, is subjected to a typical case-hardening treatment wherein the wedge, as a whole, is heated to a temperature above the critical temperature, e.g., 1400° F., of the steel, and then water-quenched. The steel for the wedge may be selected, or the heat treatment thereof conducted, to provide a wedge having an outer surface slightly softer than the outer surfaces of the shoes. However, the hardness of the wedge as developed by the treatment just described gradually decreases with depth and is much harder and less malleable in its entirety than the shoes. This arrangement permits the hard wear resistant shoe surface 55 to yield to impacting by the hard body of the wedge and thus shape to the opposed wedge surface without appreciable wear.

The invention is served also by a reversal of the heat treatment and relative flatness of opposed surfaces of the wedge and shoes just described in the three preceding paragraphs. That is to say, the shoes 31 have a carburized layer but receive a relatively deep-quench treatment whereas the carburized layer of the wedge receives a "skin hardening" treatment leaving relatively soft steel underneath which is substantially unaffected by any heat treatment. The surfaces 55 of the shoes are flat while the opposed surfaces 54 of the wedge are provided with a slight convexity which is pounded into a substantially flat conformity with the surfaces 55 during service.

As shown, the spring seat element 24 is formed with identical opposite faces centrally recessed to divide each face into the outer marginal annular surface 48 and the recessed surface 59. Frontside surface 48 engages the shoe surfaces 47. Rearside surfaces 43 and 59 engage the larger spring 26 and the smaller spring 27, respectively, of the central spring set 25. The outer and inner radii of the surfaces 48 are such that the frontside surface 48 is preferably entirely covered by the shoe surfaces 47. As the element 24 comprises a softer material than the skin layer of the shoes, the surface 48 wears uniformly across its entire width because of complete radial coverage. However, the shoe surfaces 47 tend to retain their shape though not covered by the surfaces 48 because they are harder and thus sustain very little wear. In assembling the draft gear, the element 24 may be installed without care as to facial orientation.

The draft gear disclosed herein is described essentially with respect to structure for dividing forces transmitted between the friction clutch and the actuating springs therefor in the special manner taught herein. Such structure substantially reduces malfunction common to the friction-clutch type of draft gear, such as seizure of the shoes with the casing barrel, and failure of the shoes to maintain frictional contact with the barrel. With this in mind, the scope of the invention is indicated by the following claims.

What is claimed is:

1. A draft gear comprising: a casing having a rear spring compartment and an open-ended barrel as its front portion, said barrel having an interior surface defining a bore centered generally along the longitudinal axis of the casing; a plurality of shoes in frictional contact with, and operatively positioned against, said interior surface; a wedge having a rear surface engageable with each shoe; and inclining inwardly and rearwardly toward said axis; springs housed in said spring compartment; spring seat means engaged on one side by the springs and on the other side by the shoes; wherein the improvement comprises:

(a) each of said shoes having a pair of rearward-facing surfaces of which one is outward from said axis with respect to the other inward surface, said outward surface inclining inwardly and rearwardly toward said axis, and said inner surface having substantially less inclination than said outer surface with respect to a plane perpendicular to said axis; and (b) said spring seat means having an inner element disposed between, and in continual engagement with, said inward shoe surfaces and a central spring of said springs, an an outer element disposed in engaged relation with other springs of said springs and in engageable relation with said outward shoe surfaces.

2. The draft gear of claim 1 comprising:
rear-facing stop means disposed in fixed relation with the casing for engagement with said outer element at a position of the shoes slightly rearward of their forwardmost operative position for spacing the outer element from said shoes at fully-expanded or neutral condition of said gear.

3. The draft gear of claim 1 wherein:
said bore tapers slightly toward the spring compartment; and
said inner element has a front face centrally recessed to provide a raised outer marginal surface in engagement with said inward shoe surfaces, the width of said marginal surface in a radial direction being less than that of said inward surfaces, said width of the marginal surface being located within the inner and outer limits of the widths of said inward surfaces and being formed of a softer material than said shoe surfaces.

4. The draft gear of claim 1 comprising:
a second spring of smaller diameter than said central spring and concentrically received therein; and
said inner element having front and rear faces of similar contour permitting reversibility in said gear; each of said faces being centrally recessed to provide a raised marginal surface for engagement with either said central spring or said inward shoe surfaces, and a recessed surface functioning as spring seat when engaged by said second spring.

5. The draft gear of claim 1 wherein:
said outer element comprises a circuitous flange adapted to extend inwardly of the rear end of the barrel in juxtaposed spaced relation with its interior surface and defining end surfaces inclining rearwardly toward said axis and in opposed relation with said outward shoe surfaces.

6. The draft gear of claim 5 wherein:
said bore tapers slightly toward the spring compartment; and
said end surfaces of the flange are convex along a radial plane of cross section containing said axis.

7. The draft gear of claim 1 wherein:
said bore tapers slightly toward the spring compartment;
said inner element has a front face centrally recessed to provide a raised outer marginal surface of less width in a radial direction than said inward shoe surfaces engaged therewith;
the width of the marginal surface is located between the limits of the widths of said inward surfaces;
said outer element has surfaces for engaging said outward shoe surfaces;
said shoes each have an inclined surface in face-to-face engaged relation with one of said rear faces of said wedge, said wedge surfaces being relatively flat and said inclined shoe surfaces being slightly convex in a plane of radial cross section; and
said shoe surfaces engaging said elements are harder than respective opposed surfaces of the elements.

8. The draft gear of claim 7 wherein:
said outer element has front-facing surfaces for engaging said outward shoe surfaces of approximately similar inclination; and said front-facing surfaces and outward shoe surfaces are approximately concave and convex, respectively, with respect to radii of curvature contained in a plane perpendicular to the direction of inclination of said surfaces.

9. The draft gear of claim 1 wherein:

said shoes each have an inclined surface in face-to-face engaged relation wtih one of said rear surfaces of said wedge, said wedge surfaces being relatively flat and said inclined shoe surfaces being slightly convex in a plane of radial cross-section;

said shoes and said wedges are of steel and each has an outer layer of up to approximately one-eighth inch in thickness characterized in that the steel of the outer layer is of relatively higher carbon content of up to approximately 0.9%, and the steel disposed inwardly of said layer has a substantially lower carbon content;

at least an outer portion of said layer of each shoe is in a "skin hardened" condition characteristic of that resulting from "flame hardening" treatment and said steel inwardly from said layer is substantially free of hardness resulting from heat treatment; and said wedge is in a condition of hardness characteristic of that resulting from "case hardening" treatment wherein the wedge has been subjected to heating above its critical temperature and water-quenching to obtain a hardened condition of said wedge layer and steel interiorly of said layer.

10. The draft gear of claim 1 wherein:

said shoes each have an inclined surface and face-to-face engaged relation with one of said rear surfaces of said wedge; said wedge surfaces being slightly convex and said inclined shoe surfaces being relatively flat in a plane of radial cross-section;

said shoes and said wedges are of steel and each has an outer layer of up to approximately one-eighth inch in thickness characterized in that the steel of the outer layer has a relatively high carbon content of up to approximately 0.9% and the steel disposed inwardly of said layer has a substantially lower carbon content;

at least an outer portion of said layer of each shoe is in a condition of hardness characteristic of that of a "case hardening" treatment wherein the shoes have been subjected to heating above the critical temperature of the steel and water-quenching to obtain a hardened condition of said outer layer of each shoe and the steel interiorly of said layer; and said wedge is in a condition wherein at least an outer portion of said outer layer thereof is in a "skin hardened" condition and said steel inwardly from said layer is substantially free of said hardness resulting from heat treatment.

References Cited

UNITED STATES PATENTS

| | | | |
|---|---|---|---|
| 1,877,329 | 9/1932 | Johnson | 213—24 |
| 1,939,652 | 12/1933 | Barrows | 213—22 |
| 2,032,341 | 2/1936 | Barrows | 213—22 |

DRAYTON E. HOFFMAN, *Primary Examiner.*